(No Model.) 2 Sheets—Sheet 1.
H. O. RITTENHOUSE.
NAVIGATOR'S POSITION INDICATOR.
No. 356,503. Patented Jan. 25, 1887.
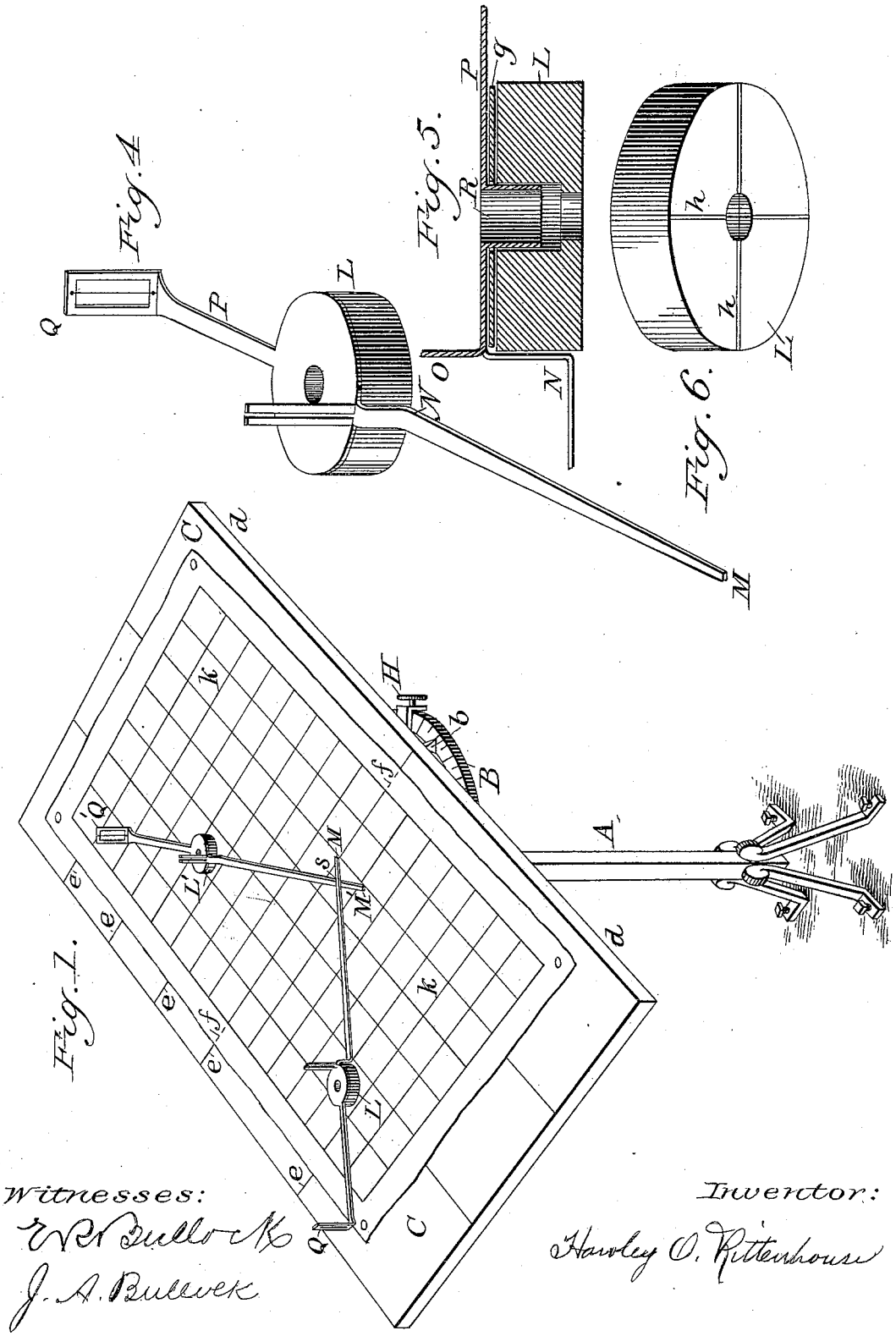

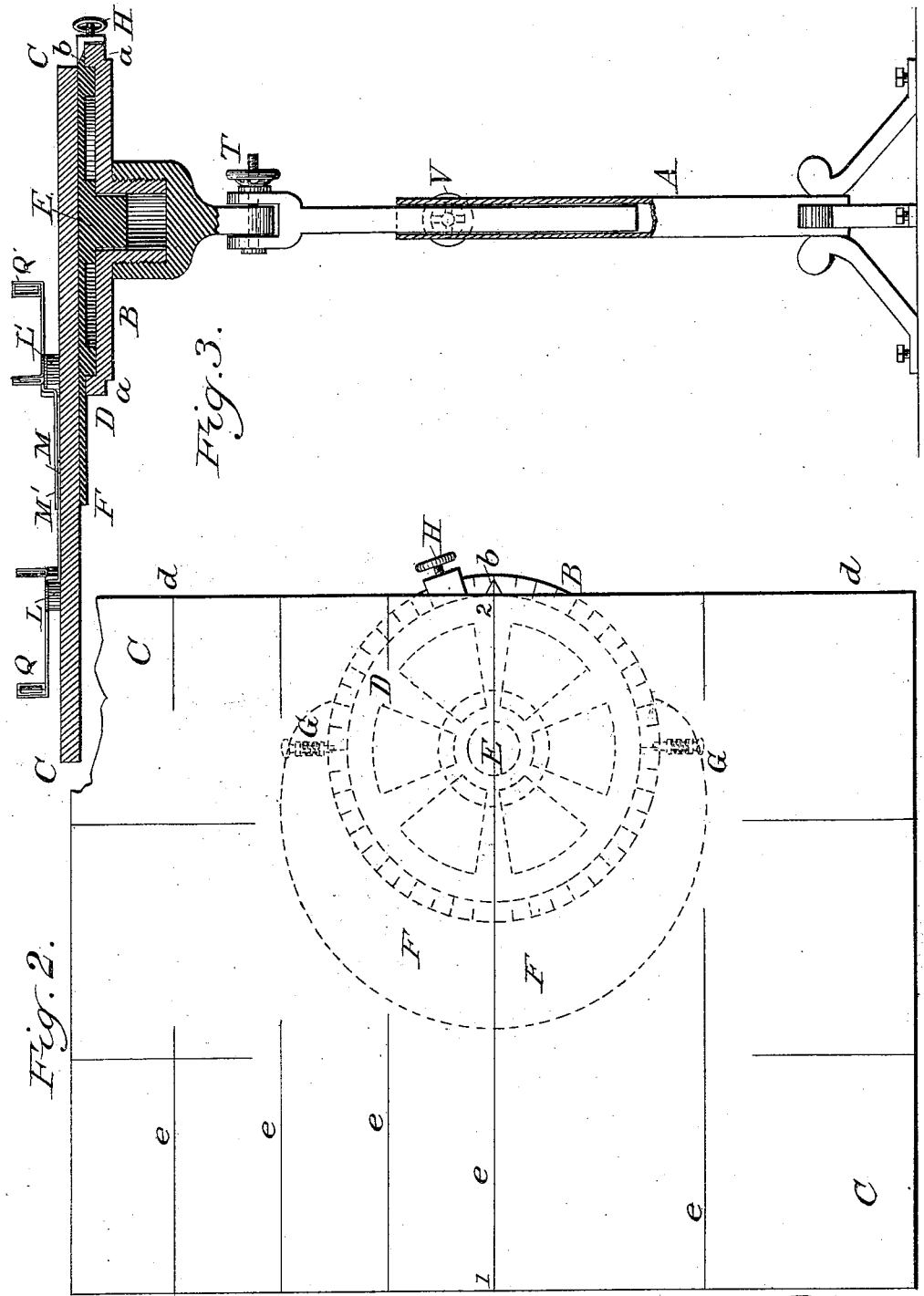

UNITED STATES PATENT OFFICE.

HAWLEY O. RITTENHOUSE, OF FLEMINGTON, NEW JERSEY.

NAVIGATOR'S POSITION-INDICATOR.

SPECIFICATION forming part of Letters Patent No. 356,503, dated January 25, 1887.

Application filed September 18, 1886. Serial No. 213,886. (No model.)

*To all whom it may concern:*

Be it known that I, HAWLEY O. RITTENHOUSE, a citizen of the United States, residing at Flemington, in the county of Hunterdon and State of New Jersey, have invented a new and useful Instrument of Navigation called a "Position-Indicator," of which the following is a specification.

My invention relates to improvements in the means of indicating the position of a vessel upon a chart when coasting or when navigating inland waters or other places where towers, buoys, lights, beacons, or other sailing-marks can be seen and recognized; and the objects of my improvements are, first, to indicate the position of the vessel without loss of time after the observations are taken, and, second, to indicate the position with increased accuracy. I attain these objects by use of the instrument shown in the drawings, in which—

Figure 1 is a perspective view of the instrument as it appears when in use; Fig. 2, a top view of the chart-table, showing its position with reference to the graduated circle or dumb-compass underneath; Fig. 3, a vertical section of a part of the instrument on the line 1 2, Fig. 2; Fig. 4, a perspective view of the station-pointer; Fig. 5, a central vertical section of a part of the station-pointer, and Fig. 6 a perspective view of that part of the station-pointer called the "station-center."

Similar letters refer to similar parts throughout the several views.

A is a pedestal and standard, secured to the deck of a vessel in some convenient place for observing the bearings of recognized stations, and terminating at its upper extremity in a fixed graduated circle or dumb-compass, B, having its zero or north point in a fore-and-aft line with its center.

C C is the chart-table, on the under side of which is secured a plate, F D, which is pivoted at E and fitted to the upper surface of the graduated circle. This plate furnishes the pivot E and bearing-surfaces by which the chart-table may be revolved horizontally over the graduated circle. A portion of the plate F F projecting beyond the graduated circle serves to strengthen the chart-table, and two spring-bolts, G G, secured to the plate and locking under the annular recess $a\ a$, Fig. 3, prevent the board from being accidentally unseated.

On the plate at $b$ is an index, by reference to which, in connection with the graduated circle, the chart-table may be turned through any desired angle, and then held by the clamp-wheel H. The plate is secured sufficiently near one edge of the table $d\ d$, and in such position that when the table is mounted for use on the standard a small portion of the graduated circle will always be exposed to view.

A convenient number of lines, $e\ e\ e$, are permanently drawn upon the chart-table parallel (or perpendicular) to the direction from the center E to the index $b$.

M L Q and M' L' Q' are station-pointers, consisting each of two principal parts—the station-center L and the pointer M N O P Q.

The station-center L is a thick hollow circular cylinder of metal of sufficient weight to carry the pointer M N O P Q and to maintain its position on the chart against the pressure of the wind and other light disturbing causes. It is provided with cross threads or wires $h\ h$ near its under surface, whose intersection determines the axis of the circular orifice.

The pointer M N O P Q consists chiefly of the straight-edge M N and of the sight-vanes O and Q, whose line of sight is parallel to the straight-edge. The middle portion is circular in shape, to correspond with the station-center, and is provided with a hollow axis or pivot, R, which fits the circular orifice of the station-center and permits the pointer to be revolved horizontally without disturbing the station-center. The straight-edge is so lined that when the pointer is in place upon the station-center the straight-edge indicates a line which passes through the intersection of the cross-threads.

The chart-table may be adjusted to different heights by the clamp-wheel V, Fig. 3, and may be leveled to compensate for heeling of the vessel by the joint and clamp-wheel T.

A washer, $g$, Fig. 5, is useful to slightly raise one of the pointers, as M' Q', Fig. 3, thus permitting its straight-edge to pass more freely over the other. To indicate the position of a vessel by this instrument, the chart-table C C is placed in position upon the graduated circle B. The chart *k k* is then laid upon the table and secured by weights or thumb-tacks in such manner that its meridians are parallel to the lines *e e* of the chart-table. The station-centers L and L' (with or without the pointers) are then each centered accurately by the cross-threads *h h* over one of the stations on the chart representing the objects to be observed. The pointers M Q and M' Q' are then pivoted upon the station-centers, if not done previously. The course or direction of the ship's head is then noted by compass and the chart-table adjusted by means of the index *b* and graduated circle B to make the meridians, and therefore all other lines on the chart lie in the true direction represented by these lines. The clamp-wheel H is then turned to hold the table. The pointers are then each turned until the line of sight over the vanes is brought into coincidence with the corresponding object observed. The intersection S, Fig. 1, of the straight-edges M N and M' N', or of lines defined by them, indicates the position of the vessel.

What I claim as my invention, and desire to secure by Letters Patent, is—

1. The combination, in a position-indicator, of a fixed graduated circle, B, having its initial point of graduation in a line through its center parallel to the keel, with a rectangular chart-table of greater surface than the graduated circle, provided with an index, *b*, and so fitted for rotation over the graduated circle that an edge, *d d*, of the table will always leave a small portion of the graduated circle exposed to convenient view for adjustment, all substantially as set forth.

2. The station-center L, having a circular orifice and provided with the cross-threads *h h*, by means of which it may be accurately adjusted over a station marked on a chart, and of sufficient weight to maintain its position over such station while in use, with the pointer M N O P Q, all substantially as set forth.

3. The pointer M N O P Q, with hollow axis R, fitted to the circular orifice in the station-center and provided with a straight-edge, M N, and with sight-vanes O Q, substantially as shown, for the purpose specified.

HAWLEY O. RITTENHOUSE.

Witnesses:
E. R. BULLOCK,
J. A. BULLOCK.